United States Patent

Allen et al.

[15] 3,698,157
[45] Oct. 17, 1972

[54] SEPARATION OF MIXTURES WITH MODIFIED ZEOLITES

[72] Inventors: Paul T. Allen; B. M. Drinkard, both of Beaumont, Tex.

[73] Assignee: Mobil Oil Corporation

[22] Filed: June 1, 1971

[21] Appl. No.: 149,050

[52] U.S. Cl. ...................55/67, 55/75, 208/310, 260/674 SA
[51] Int. Cl. ...................B01d 15/08, C07c 7/12
[58] Field of Search .....260/674 SA; 208/310; 55/67, 55/75

[56] References Cited

UNITED STATES PATENTS 2,614,135  10/1952  Hirschler ..................260/674
3,653,184  4/1972   Drinkard et al. ..............55/67
3,658,696  4/1972   Shively et al. ..............208/310
3,656,278  4/1972   Drinkard et al. ..............55/67

*Primary Examiner*—Delbert E. Gantz
*Assistant Examiner*—C. E. Spresser
*Attorney*—Oswald G. Hayes and Andrew L. Gaboriault

[57] ABSTRACT

An improved method for separation and isolation of individual components contained in a $C_8$ aromatic mixture such as p-xylene and ethylbenzene, by contacting the mixture with an aluminosilicate zeolite which has been contacted with an organic-radical substituted silane to modify the characteristics of the zeolite.

24 Claims, No Drawings

3,698,157

SEPARATION OF MIXTURES WITH MODIFIED ZEOLITES

BACKGROUND OF THE INVENTION

1. Field of the Invention

This invention relates to the gas chromatographic separation of $C_8$ aromatic mixtures and more particularly to a chromatographic method for the separation of a mixture so as to recover essentially pure p-xylene and ethylbenzene in the presence of a certain zeolite.

2. Description of the Prior Art

Gas chromatography, as a method for the separation of mixtures of difficultly separable materials, has been well known for some time. In general, the method operates on the principle of distribution of the components of a sample over separate phases and subsequent separation of these phases. For example, in gas-liquid chromatography, the volatile components of a sample are distributed between an inert gas phase (carrier gas) and a stationary liquid. Similarly in adsorption chromatography, there is obtained sample distribution over a solid absorbent and a moving liquid phase. Columns packed with the stationary liquid or solid adsorbent are usually employed to effect the separations by passage of the mixture to be separated therethrough. Hence, chromatography is a physical method of separation in which the components to be separated are distributed between two phases, one of the phases constituting a stationary bed of large surface area, the other being a fluid that percolates through or along the stationary bed.

While chromatography has been applied to the separation of many difficultly separable mixtures with great success, the separation of close-boiling isomeric mixtures has not been particularly successful. One such mixture is $C_8$ aromatics and especially a mixture of ethylbenzene, ortho-xylene, meta-xylene and para-xylene, particularly on a production scale and in a very high state of purity. Para-xylene, in particular, is required in a very high state of purity for the manufacture of terephthalic acid which is an intermediate in the manufacture of synthetic fibers such as "Dacron." The ethylbenzene is also an important intermediate for making styrene by dehydrogenation. Normally they are separated from a product stream containing ethylbenzene, para-xylene, meta-xylene and ortho-xylene by costly superfractionation and multistage refrigeration steps. This process involves high operation costs and has a limited yield.

It has also long been known that porous substances such as silica gel, activated char, and certain zeolites, have certain selective adsorption characteristics useful in resolving a hydrocarbon mixture into its component parts. Thus, silica gel is selective in removing aromatic hydrocarbons from non-aromatic hydrocarbons and activated chars are useful in separating olefins from mixtures with paraffins. Similarly, the molecular sieve properties of zeolites have been utilized to selectively remove one molecular species from a mixture of the same with other species.

Although a wide variety of zeolitic materials, particularly crystalline aluminosilicates, have been successfully employed in various separation schemes, nevertheless, these prior art processes, in general, fell into one or two main categories. In one type, a zeolite is employed having a pore size sufficiently large to admit the vast majority of components normally found in a process stream. These molecular sieves are referred to as large pore zeolites and they are generally stated to have a pore size of about 13A such as zeolite X, Y, and L. The other type of crystalline aluminosilicates are those having a pore size of approximately 5A which are utilized to separate small molecules such as n-paraffins to the substantial exclusion of other molecular species. The zeolites of these types, however, are not generally capable of effectively separating the close-boiling $C_8$ aromatics.

Another proposed solution to this problem is set forth in U.S. Pat. No. 3,126,425. This patent discloses contacting a mixture of xylene isomers with crystalline aluminosilicates such that the ortho- and meta-isomers are sorbed by said aluminosilicates and the para-isomer is concentrated in the unabsorbed portion. This method is concerned with the concentration of the more symmetrical disubstituted aromatic isomer, such as para-xylene, in the unadsorbed stream. It therefore apparently represents an extension of the normal relative partitioning of xylene isomers with high surface area solids to the more selective crystalline aluminosilicate surface. All of the isomers described in the above patent will be sorbed by crystalline aluminosilicates having uniform pore openings of 10–13 Angstrom units. The separations shown are therefore not dependent on the molecular sieving properties of the 13 Angstrom zeolite, but rather, on the relative partitioning of the said isomers between the intracrystalline sorbed phase and the free liquid phase. This method is therefore severely limited and may as stated be restricted because of economic considerations to processing only streams containing 50 percent or more para-xylene. The normal concentration of paraxylene in equilibrium mixtures of xylene isomers obtained from commercial isomerization units is generally about 24 weight percent so that this method will not accomplish the desired separation on feeds such as this.

In still a later development by Applicants' assignee, it was discovered that selective separations of this type can be achieved by utilizing a unique class of crystalline aluminosilicates which possess unique molecular sieving properties in that they allow entry and egress to their internal pore structure of not only normal paraffins but also of slightly branched paraffins and yet have the ability to effectively exclude paraffins possessing quaternary carbon atoms at short contact times. These zeolites also possess the ability to selectively sorb simple, lightly-substituted monocyclic hydrocarbons from mixed hydrocarbon streams containing highly-substituted monocyclic, polycyclic, heterocyclic or even simple polycyclic hydrocarbons. These zeolites also possess the unique property of selectively sorbing 1,4-disubstituted aromatic compounds in admixture with 1,2-, 1,3-, or more highly substituted aromatic hydrocarbons. Para-xylene, for example, can be selectively separated from ortho- and meta-xylene by contacting said mixture with this unique class of zeolites. This discovery is fully disclosed and claimed in copending J. Cattanach application Ser. No. 882,692, filed Dec. 5, 1969, of Applicants' assignee.

In subsequent developments by Applicants' assignee, and as set forth in copending earlier filed U. S. applications Ser. No. 44,460 now U.S. Pat. No. 3,656,278, and Ser. No. 44,459, now U.S. Pat. No. 3,653,184, both filed June 8, 1970 by B. M. Drinkard et al, there are disclosed gas chromatographic separations of aromatic mixtures for the recovery of ethylbenzene o-xylene, m-xylene and p-xylene by contacting a $C_8$ aromatic mixture with a certain crystalline zeolite to recover ethylbenzene, a mixture of m- and o-xylene and p-xylene and then separating the m- and o-xylene over a liquid phase partitioning agent (44,460). In Ser. No. 44,459, the mixture is first contacted with the partitioning agent to separate ethylbenzene, o-xylene and a mixture of m- and p-xylenes. The latter is then separated over the zeolite. The crystalline aluminosilicate zeolites employed in the process of these copending applications are disclosed as being ZSM-5 and ZSM-8 zeolites.

In addition, in application Ser. No. 13,784 of George T. Kerr, entitled, "ZEOLITE ESTERS," filed Feb. 24, 1970 of Applicants' assignee, there are disclosed as novel compositions of matter, crystalline aluminosilicate esters made by reacting a crystalline aluminosilicate having available hydrogen atoms with an organic silane having an SiH group. The resulting compositions are indicated as being useful for hydrocarbon conversion processes, particularly hydrocracking.

According to the present invention, it has been discovered that modified ZSM-5 and ZSM-8 type crystalline aluminosilicate zeolites, wherein said modification is carried out by contacting the zeolites with organic radical-substituted silanes provide unexpected and advantageous results in the gas chromatographic separation of the mixture of compounds contained in a $C_8$ aromatic feedstock.

SUMMARY OF THE INVENTION

It is accordingly one object of the invention to provide a process which overcomes or otherwise mitigates the disadvantages of the prior art in this area.

A further object of the invention is to provide a chromatographic separation process for the separation and isolation of mixtures of compounds contained in $C_8$ aromatic mixtures.

A still further object is to provide a gas chromatographic separation process for the recovery of highly pure p-xylene and/or ethylbenzene from a $C_8$ aromatic mixture employing in the chromatographic column a modified crystalline aluminosilicate zeolite.

Other objects and advantages of the present invention will become apparent as the description thereof proceeds.

In satisfaction of the foregoing objects and advantages there is provided by this invention a process for the treatment of a $C_8$ aromatic feedstock for the recovery and isolation of substantially pure p-xylene in one embodiment, and p-xylene and ethylbenzene in a second aspect, which comprises contacting a $C_8$ aromatic feedstock with a crystalline aluminosilicate which has been contacted with an organic radical-substituted silane. It has been found that a gas chromatographic separation carried out in the presence of the modified zeolite disclosed herein results in a reduction of the m- and o-xylene adsorption thereby improving the product purity of p-xylene and ethylbenzene. In addition, the invention includes the concept of subsequently separating the m- and o-xylene in a second column to effect a two-step process. Also provided are the modified zeolites as formed by contacting of the crystalline aluminosilicates and the organic silane compounds.

DESCRIPTION OF THE PREFERRED EMBODIMENTS

As pointed out above, the process of the present invention provides a chromatographic separation process for treatment of a $C_8$ aromatic feedstock that improves the purity of the valuable p-xylene and ethylbenzene components recovered therefrom. According to this invention, the $C_8$ aromatic feedstock is contacted in a gas chromatographic apparatus with a crystalline aluminosilicate zeolite which has been chemically modified by treatment with an organic substituted silane. It has been found that unexpected results are obtained employing this material in the chromatographic column.

The modified zeolite compound employed in the process of the present invention, can be generally described as the reaction product of a crystalline aluminosilicate with an organic substituted silane. The organic substituted silanes deemed useful in the process of the present invention are those of the following general formula:

wherein, in the above formula R is an organic radical as described hereinafter and each $R_1$ is also an organic radical such as those defined below for the group R, a hydrogen atom or a halogen atom such as chlorine or bromine. Organic radicals which may be R or $R_1$ include alkyl of 1 and more preferably up to about 40 carbon atoms, alkyl or aryl carboxylic acid acyl wherein the organic portion of said acyl group contains about one to 30 carbon atoms and said aryl group contains about six to 24 carbon atoms, aryl groups of about six to 24 carbons, which may also be further substituted, alkaryl and aralkyl groups containing about seven up to about 30 carbon atoms. Highly preferred compounds falling within the above structure are those wherein R is alkyl of about 12 to 24 carbon atoms, i.e., the long chained alkyl groups, and each $R_1$ is hydrogen or chlorine. Highly preferred silanes are octadecyltrichlorosilane and dodecyltrichlorosilane. Organic silanes of the type useful in the process of the present invention are known in the art and may be prepared by known methods. For example, the tetrachloro substituted silane, $SiCl_4$, may be prepared by the reaction of chlorine and silica and the resulting product may then be reacted with the desired number of moles of a metal salt of the organic compound containing the radical for R or $R_1$ desired, by heating. Other silanes employed in the process of the present invention may be prepared by similar procedures, all of which are well known in the art.

The desired silane is then contacted with a zeolite of the type described hereinafter, one requirement of the zeolite being that it have an available hydrogen for reaction. The silane should be selected so that steric hindrance problems are avoided. Thus in the above formula, R and only two $R_1$ should be organic radicals which means that at least one $R_1$ should be halogen.

The selected silane and the crystalline aluminosilicate zeolite are contacted in the preferred procedure at an elevated temperature. Preferably, the silane and zeolite are contacted on a weight basis of about 1:5 to 5:1, preferably about 1:2 to 1:1, respectively. It is also preferable that a binder for the zeolite be employed such as, for example, bentonite. For good contact between the reactants, it is also preferable to employ a reaction medium. Satisfactory reaction media include the ethers, aliphatic hydrocarbons and halo-substituted aliphatic hydrocarbons of 5 to about 8 carbon atoms, (e.g., n-heptane), the aromatic, halo-substituted aromatic hydrocarbons and nitrogen containing compounds such as heterocyclics. A particularly preferred media is pyridine.

As indicated, an elevated temperature should also be employed for the reaction, preferably a temperature of about 75° to 200° C. A convenient procedure is to charge the reactants to the medium and heat at the reflux point of the system for about 1 to 10 hours. The mixture is then contacted with a volatile solvent such as chloroform or n-pentane, filtered and dried in an oven at a temperature of about 75° to 125° C.

The resulting modified zeolite may be described as a crystalline aluminosilicate having the organic substituted silane chemically bonded thereto and the resulting zeolite is thermally stable.

As has been stated, the separation process of this invention is a chromatographic one. This is intended to describe a process wherein separation is based on selective adsorption of at least one component of a mixture by a solid. The solid is the modified zeolite previously described.

The novel chromatographic separation process of this invention is carried out merely by contacting the hydrocarbon mixture described, existing either as a gas, liquid or mixed phase with the modified crystalline zeolite such that the desired component is concentrated in either the sorbed or non-sorbed phase. A suitable fluid carrier can be employed if such is desired. Typical carriers include polar and non-polar compounds such as nitrogen, air, steam, water, hydrogen, hydrocarbons, helium, etc. The process can be carried out in either a batch or a continuous operation. The sorbed material can be subsequently recovered by conventional desorbing techniques such as thermal stripping, stripping with an inert gas, e.g., nitrogen, helium, etc. or evacuation of elutriation with a suitable polar or non-polar stripping agent, e.g., water, n-hexane, etc.

In general, the process of the invention utilizes a chromatographic separation of the mixture of ethylbenzene, ortho-xylene, meta-xylene, and para-xylene into its component parts. This mixture, which is generally a feed reformate from a commercial unit, either as a gas, liquid or mixed phase, is preferably contacted with the carrier and then contacted with the modified zeolite. Conveniently, contact with the zeolite is carried out in a column, that is, the zeolite is maintained in a column and the feed/carrier mixture is passed therethrough. The separated components are then recovered on elution.

In one embodiment of the process of the invention, the $C_8$ aromatic feed mixture would contain about up to 15 weight percent of ethylbenzene, about 20 to 30 weight percent of paraxylene, about 40 to 50 weight percent of meta-xylene and about 15 to 25 weight percent of ortho-xylene. In this embodiment, contact of this mixture with the zeolite would first separate a mixture of the meta-xylene and ortho-xylene followed by the para-xylene and then the ethylbenzene. In this procedure, adsorption of the m- and o-xylene is substantially reduced.

In a second embodiment of the process, the $C_8$ aromatic feed mixture starting material contains no or very little ethyl-benzene and a separation of p-xylene in high purity is effected. In this embodiment, a $C_8$ mixture of m-, o- and p-xylene and is admixed with a carrier and contacted with the modified zeolite. There is initially eluted a mixture of the m- and o-xylene followed by very pure xylene.

Generally in practicing the process, the modified zeolite is packed into a column and the feedstock is fed therethrough. In typical liquid phase chromatography, the products are recovered from the column by elution with a liquid such as an organic solvent. In typical vapor phase operations, the products are eluted from the column by carrier gas.

In a further main embodiment of the process, the mixture of m-xylene and ortho-xylene from the modified zeolite column can also be separated by gas chromatographic separation over a chromatographic liquid phase partitioning agent in a second column. Thus in this procedure, a two-column system is set up, a first column containing the zeolite ester and a second column containing the liquid partitioning agent. In general, the column containing the liquid partitioning agent or adsorbent is about twenty times larger in volume than the zeolite-containing column, although this may be varied depending on other conditions of the process.

In this second step of the process, the mixture of ortho-xylene and meta-xylene, initially eluted from the zeolite-containing column, is then transmitted through the second column containing the standard liquid partitioning phase substance together with the carrier. In this column the two components of this mixture are separated to provide initially the meta-xylene in > 99 percent purity and thereafter the ortho-xylene in > 99 percent purity, both in substantially quantitive fields. In this column, the meta-xylene is sorbed at a slower rate than the ortho-xylene. Thus from this mixture the process provides means for recovery of all the valuable components in highly purified form.

In conducting the reaction the $C_8$ aromatic feed would be contacted with a gaseous carrier, preferably helium or steam, although others may be used, and passed through the chromatographic column containing the modified crystalline aluminosilicates. As the mixture passes through the column, it has been found that, quite unexpectedly, the modification performed on the zeolite has the effect of reducing the m- and o-xylene adsorption, as measured by peak tailing, and thereby improves p-xylene and ethylbenzene product purity. Thus, since adsorption of the m- and o-xylene is reduced over the modified zeolite, the m- and o-xylene mixture passes through the zeolite-packed column quickly and well ahead of the p-xylene and ethylbenzene. Thereafter the p-xylene is eluted followed by the ethylbenzene. Both of these latter products are of a purity of better than 98% compared to products of about 92 percent purity obtained with the unmodified zeolites.

After the ortho-xylene and meta-xylene mixture is recovered as the first elutant, it is then separated in the second column. In the second column, there is maintained a gas-liquid chromatographic medium, ordinarily employed for separation of components as they pass through a column with a carrier gas. A preferred material as this type is known commercially as Tergitol NPX (nonyl phenol ether of polyethylene glycol). However, equivalent materials may also be employed with substantially the same results. Such materials are, for example, m-bis (m-phenoxy-phenoxy) benzene + 2 percent squalane; UCON 1540 or UCON LB-550X, sold under those tradenames by Union Carbide Corporation; di-n-propyl tetrachlorophthalate; squalane; 40 percent 1,2,3 tris (2-cyanoethoxy) propane + 60 percent oxybis (2ethyl benzoate); and di-n-decylphthalate. Obviously, equivalent materials may also be used. In general, however, the second column may be said to contain any stationary phase liquid partitioning agent as known in the chromatographic art.

The temperature at which the separations are carried out is important. Thus, the novel process of this invention can be carried out at temperatures ranging from about 100° C. to about 250° C. It should be noted that a wider temperature range can be employed but because of the possibility of catalytic conversion in the zeolite-containing column, 250° C. appears to be a suitable upper limit. A more preferred temperature range appears to be between about 100° to 200° C. It is noted that the above temperatures might vary slightly depending upon the particular cationic form of the crystalline aluminosilicate zeolite employed but, in general, they represent operable parameters for carrying out the novel process of this invention.

There may, of course, be used any of the active aluminosilicate zeolites known to the art for reaction with the silanes and use in the process of this invention. However, the class of aluminosilicates known as ZSM-5 zeolites and described hereinafter are highly preferred.

As indicated above, the zeolites utilized in the column are of a special type and are disclosed and claimed for use in a novel zeolite chromatographic process in copending Application Ser. No. 882,692, filed Dec. 5, 1969, J. Cattanach of the same assignee. Generally, these zeolitic materials allow selective separations to be achieved depending on either the size, shape or polarity of the sorbate molecules. This class of novel crystalline aluminosilicates can generally be stated to have intermediate shape-selective sorption properties. The unique nature of this novel class of zeolites is characterized by the presence of uniform pore openings which are apparently elliptical rather than circular in nature. The effective pore openings of this unique class of zeolites have both a major and minor axis, and it is for this reason that the unusual and novel molecular sieving effects are achieved. The unique type of molecular sieving produced has generally been referred to as a "keyhole" molecular sieving action. From their dynamic molecular sieving properties it would appear that the major and minor axis of the elliptical pore in this family of zeolites have effective sizes of about 7.0 ± 0.7A and 5.0 ± 0.5A, respectively.

This general family of zeolites are described as ZSM-5 type compositions. In general, they have the characteristic X-ray diffraction pattern set forth in Table 1 hereinbelow. ZSM-5 compositions can also be identified, in terms of mole ratios of oxides, as follows:

$$0.9 \pm 0.2 M_{2/n}O : W_2O_3 : 5-100 YO_2 : zH_2O$$

wherein M is a cation, n is the valence of said cation, W is selected from the group consisting of aluminum and gallium, Y is selected from the group consisting of silicon and germanium, and Z is from 0 to 40. In a more preferred synthesized form, the zeolite has a formula, in terms of mole ratios of oxides, as follows:

$$0.9 \pm 0.2 M_{2/n}O : Al_2O_3 : 5-100 SiO_2 : zH_2O$$

and M is selected from the group consisting of a mixture of alkali metal cations, especially sodium, and tetraalkylammonium cations, the alkyl groups of which preferably contain two to five carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the significant lines set forth in Table 1 following:

TABLE 1

| Interplanar Spacing $d$(A) | Relative Intensity |
| --- | --- |
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/I, where I is the intensity of the strongest line or peak, and $d$ (obs.), the interplanar spacing in A, corresponding to the recorded lines, were calculated. In Table 1 the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with other cations reveals substantially the same pattern with some minor shifts in interplanar spacing and variation in relative intensity. Other minor variations can occur depending on the silicon to aluminum ratio of the particular sample, as well as if it had been subjected to thermal treatment. Various cation exchanged forms of ZSM-5 have been prepared. X-ray powder diffraction patterns of several of these forms are set forth below in Table 2. The ZSM-5 forms set forth below are all aluminosilicates.

TABLE 2

X-Ray Diffraction

ZSM-5 Powder in Cation Exchanged Forms $d$ Spacings Observed

| As Made | HCl | NaCl | CaCl$_2$ | RECl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 4.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | — | 2.10 | 2.10 |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

| | Broad | Preferred | Particularly Preferred |
|---|---|---|---|
| OH$^-$/SiO$_2$ | 0.07–1.0 | 0.1–0.8 | 0.2–0.75 |
| R$_4$N$^+$/(R$_4$N$^+$+Na$^+$) | 0.2–0.95 | 0.3–0.9 | 0.4–0.9 |
| H$_2$O/OH$^-$ | 10–300 | 10–300 | 10–300 |
| YO$_2$/W$_2$O$_3$ | 5–100 | 10–60 | 10–40 | wherein R is propyl, W is aluminum or gallium and Y is silicon or germanium, maintaining the mixture until crystals of the zeolite are formed. Thereafter, the crystals are separated from the liquid and recovered. Typical reaction conditions consist of heating the foregoing reaction mixture to a temperature of from about 90° to 200° C for a period of time of from about 6 hours to 60 days. A more preferred temperature range is from about 100° to 175° C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F, for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. The family of ZSM-5 zeolites is disclosed and claimed in copending application Ser. No. 865,472, filed Oct. 10, 1969, of Applicants' assignee.

Another operable zeolite falling within the above class and useful in the process of the invention is zeolite ZSM-8 which is described and claimed in Ser. No. 865,418, filed Oct. 10, 1969, of Applicants' assignee.

The ZSM-8 family can also be identified, in terms of mole ratios of oxides, as follows:

$$0.9 \pm 0.2 M_{2/n}O : Al_2O_3 : 5-100 SiO_2 : zH_2O$$

wherein M is at least one cation, $n$ is the valence thereof and $z$ is from 0 to 40. In a preferred synthesized form, the zeolite has a formula, in terms of mole ratios of oxides, as follows:

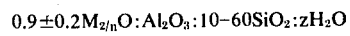
$$0.9 \pm 0.2 M_{2/n}O : Al_2O_3 : 10-60 SiO_2 : zH_2O$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| dA° | I/Io | I/Io | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | | |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ — from about 10 to about 200
$Na_2O$/tetraethylammonium hydroxide — from about 0.05 to 0.20
Tetraethylammonium hydroxide/$SiO_2$ — from about 0.08 to 1.0
$H_2O$/tetraethylammonium hydroxide — from about 80 to about 200

Thereafter, the crystals are separated from the liquid and recovered. Typical reaction conditions consist of heating the foregoing reaction mixture to a temperature of from about 100° to 175° C for a period of time of from about 6 hours to 60 days. A more preferred temperature range is from about 150° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F, for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No. 3,140,249; U.S. Pat. No. 3,140,251; and U.S. Pat. No. 3,140,253.

Following contact with the salt solution of the desired replacing cation, the zeolites are then preferably washed with water and dried at a temperature ranging from 150° F to about 600° F and thereafter calcined in air or other inert gas at temperatures ranging from about 500° to 1500° F for periods of time ranging from 1 to 48 hours or more.

Prior to use, the zeolites should be dehydrated at least partially. This can be done by heating to a temperature in the range of 200° to 600° C. in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

In practicing the process, it may be desired to incorporate the zeolite with another material resistant to the temperatures and other conditions employed in the separation processes. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides.

Naturally occurring clays which can be composited with the zeolites include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-5 type zeolites can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-5 and inorganic oxide gel matrix vary widely with the crystalline aluminosilicate content ranging from about 1 to about 99 percent by weight and more usually, particularly when the composite is prepared in the form of beads in the range of about 40 to about 90 percent by weight of the composite.

Another embodiment of this invention resides in subjecting the zeolite ZSM-5 type to a mild steam treatment carried out at elevated temperatures of 800° to 1500° F. and preferably at temperatures of about 1000° to 1400° F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

The carriers which may be employed are discussed hereinabove. Also, the process may be carried out in either a batch or continuous operation. The sorbed material can be subsequently recovered by conventional desorbing techniques such as thermal stripping, stripping with an inert gas, e.g., nitrogen, helium, etc. or evacuation or elutriation with a suitable polar or non-polar stripping agent, e.g., water, n-hexane, etc.

The following examples will illustrate the best mode contemplated for carrying out the present invention.

EXAMPLES 1–4

Typical preparations of ZSM-5 type zeolites are shown in these examples. Examples 1–3 show the preparation of the hydrogen form ZSM-5 and they involve the use of tetrapropyl-ammonium hydroxide (TPAOH) or bromide (TPABr). Example 4 shows a typical preparation of the hydrogen form ZSM-8 using tetraethyl ammonium hydroxide (TEAOH). Reaction conditions and results are shown in Table 5.

TABLE 5

|  | 1 | 2 | 3 | 4 |
|---|---|---|---|---|
| Reaction composition | 30 g. NaAlO$_2$<br>720 g. Ludox<br>1,025 g. of 2.2N TPAOH | 281 g. Sorbead fines<br>3.3 lb. TPABr solution | 0.56 lb. NaAlO$_2$<br>44.7 lb. Q-brand<br>5.6 lb. TPABr<br>16.7 lb. NaCl<br>4.5 lb. H$_2$SO$_4$<br>132.0 lb. H$_2$O | 13 g. NaAlO$_2$.<br>300 g. 40% TEAOH.<br>300 g. H$_2$O.<br>1,000 g. Ludox. |
| Reaction temperature (° C.) | 150 | 100 | 100 | 193. |
| Time (hr.) | 168 | 168 | 327 | 144. |

Washed, dried at 230° F., calcined 16 hrs. at 1,000° F.

NH$_4$Cl solution

| Base Exchange: |  |  |  |  |
|---|---|---|---|---|
| Conc. (wt. percent) | 25 | 5 | 25 | 25. |
| Temp. (° C.) | 90 | 25 | 90 | 90. |
| Contacts | x3 | x4 | x3 | x3. |
| Pelleted: |  |  |  |  |
| Calcined: |  |  |  |  |
| Hr. | 16 | 10 | 16 | 16. |
| ° F. | 1,000 | 1,000 | 1,000 | 1,000. |
| Steamed: |  |  |  |  |
| Hr. | 14 | 24 | 14 | 14. |
| ° F. | 1,290 | 1,200 | 1,290 | 1,290. |
| P.s.i.a. | 15 | 30 | 15 | 15. |
| Chemical composition (g./100 g.): |  |  |  |  |
| Na | 0.08 | 0.23 | 0.02 | <.5. |
| Al$_2$O$_3$ | 4.7 | 2.2 | 3.0 | 3.0. |
| SiO$_2$ | 96.9 | 95.3 | 94.8 | 95.9. |
| X-ray type | ZSM–5 | ZSM–5 | ZSM–5 | ZSM–8. |

EXAMPLE 5

In this example 30 parts of a ZSM-5 crystalline alumino-silicate zeolite of the type prepared in Examples 1-4 comprising 80 parts ZSM-5 and 20 parts bentonite binder, were refluxed with octadeclytrichlorosilane in a weight ratio of 1:1 in 200 cc normal-heptane solvent for a period of four hours. Thereafter the resulting solid product was recovered by decantation, the solid washed first with chloroform, then with normal-pentane and then dried at a temperature of 125° C. for 4 hours.

EXAMPLE 6

In this example 20 grams of the zeolite prepared in accordance with Example 5 was packed into a gas chromatographic column maintained at a temperature of 180° C. and employed in a $C_8$ aromatic separation. The feedstock was pumped to the top of the zeolite chromatographic column at a pumping speed of 4 ml. per hour and there admixed with carrier steam pumped at a rate of 25 ml. per hour. The feedstock contained 15 weight percent ethylbenzene, 18 weight percent p-xylene, 41 weight percent m-xylene, and 26 weight percent o-xylene. The mixture was then allowed to pass through the chromatographic column containing the surface-modified zeolite. Fractions were eluted from the column using a helium flow and steam as a stripping agent. After about two minutes the first fraction recovered was a mixture of o-xylene and m-xylene. Thereafter, in the period of about three to five minutes there was eluted p-xylene following in the period of five to eight minutes, ethylbenzene. The p-xylene and ethylbenzene products recovered showed a purity of greater than 98 percent at a throughput of 0.2 lb. feed/hr./lb/ of packing. Also, as measured by peak tailing, surface adsorption of the m- and ortho-xylene was substantially reduced.

EXAMPLE 7

The process of Example 6 was repeated except that there was maintained in the column a ZSM-5 zeolite of the same type but which had not been contacted with the octadecyltrichlorosilane. The results showed the recovery of the p-xylene fraction of a purity of only about 87 percent and a throughput of 0.2 lb. feed/hr./lb. of packing thus demonstrating the efficiency of the use of the silane-modified zeolites.

EXAMPLE 8

In this example, there is illustrated the embodiment of separating the ethylbenzene, p-xylene, m-xylene and o-xylene into its component parts utilizing a zeolite-containing column and a second column containing a liquid partitioning agent. Thus in this example, a first column eleven inches long and 0.5 inches in diameter was packed with 20 grams of ZSM-5 zeolite prepared in accordance with the procedure of Example 5 and maintained at 180° C. A second column 10 feet long and 0.50 inches in diameter was provided containing Tergitol NPX on Chromosorb P. The feed was 0.6 ml of a reformate of the following composition:

| | |
|---|---|
| ethylbenzene | 15 weight percent |
| para-xylene | 18 weight percent |
| meta-xylene | 42 weight percent |
| ortho-xylene | 25 weight percent |

This mixture was pumped to the top of the first column (zeolite) at a pumping speed of 4 ml/hr and there admixed with steam, pumped at a rate of 25 ml/hr in a vaporizer. The mixture was then passed through the zeolite-containing column. Fractions were eluted from the column using a steam flow as a stripping agent. After one minute the first fraction was recovered which was 0.4 ml of a mixture of ortho-xylene and meta-xylene.

In the period of 5-6 minutes, there was eluted 0.11 ml of para-xylene which analysis showed had a purity of >98 percent. Then, in the period of 7-9 minutes, 0.09 ml of ethylbenzene was eluted which analysis indicated had a purity of >98 percent.

The 0.40 ml mixture of ortho- and meta-xylene was then passed to the top of the second column for contact with the Tergitol NPX. Fractions were eluted from the bottom of this column in the same manner. From this column, in the period of 9-12 minutes, 0.25 ml of meta-xylene was eluted which analyzed as 99 percent pure and in the period of 13-14 minutes, 0.15 ml of 99 percent pure ortho-xylene was eluted. Recovery of each component was essentially 100 percent.

This specific working example illustrates the process as being carried out utilizing two separate columns, one containing the ODTCS contacted zeolite and the other containing the partitioning agent. Quite obviously, however, the separation procedure could also be effected in a single-stage column or chromatographic process which could contain combinations of the separation media. Thus in this embodimnet, a single column would be utilized with the column containing the ODTCS contacted zeolite as the first separation medium and the partitioning agent as the second separation medium. Also, the technique of Example 8 can also be employed in the embodiment of Example 10.

EXAMPLE 9

This example illustrates preparation of a zeolite ester. In this preparation 80 parts 60-80 mesh ZSM-5 zeolite in admixture with 20 parts bentonite binder were mixed with octadecyltrichlorosilane in a weight ratio of 1:5, respectively, placed in 200 cc n-heptane and refluxed for four hours. Then the mixture was decanted, washed with chloroform and n-pentane and dried at 125° C. for four hours.

EXAMPLE 10

In this example 20 grams of the zeolite prepared in accordance with Example 9 was packed into a chromatographic column maintained at ambient temperature and employed in a $C_8$ aromatic separation. The feedstock contained 30 weight percent p-xylene, 50 weight percent m-xylene and 20 weight percent o-xylene. Six ml of the feedstock was pumped to the top of the zeolite chromatographic column and was then allowed to pass through the chromatographic column containing the ODTCS contacted zeolite. The mixture of m- and o-xylene was then removed by washing with pseudocumene. Thereafter the p-xylene was recovered by eluting with n-heptane. The p-xylene recovered in this example was a purity of >99 percent, thus being of sufficient purity for terephthalic acid manufacture. The alkyl groups chemically bonded to the surface of the ZSM-5 particles essentially eliminated m- and o-xylene sorption but did not appear to greatly affect p-xylene sorption properties.

The invention has been described herein with reference to certain preferred embodiments. However, it is not to be considered as limited thereto as obvious variations thereon will become apparent to those skilled in the art.

We claim:

1. A process for the separation of a $C_8$ aromatic mixture for the recovery of the para-xylene therefrom which comprises contacting said mixture with a modified zeolite formed by the reaction of a crystalline zeolite material with an organic radical-substituted silane of the formula:

wherein R is an organic radial and each $R_1$ is an organic radical the same as R, hydrogen or a halogen atom, provided that at least one $R_1$ is halogen, by contacting said mixture with said modified zeolite, whereby said components are sorbed at different respective rates by said modified zeolite and recovering the para-xylene.

2. A process according to claim 1 wherein the zeolite is selected from the group consisting of ZSM-5 type zeolites having the X-ray diffraction pattern of Table 1, ZSM-8 zeolites having the X-ray diffraction pattern of Table 4 and mixtures thereof.

3. A process according to claim 2 wherein the modified zeolite is maintained in a column maintained at an elevated temperature, and said mixture and a carrier is passed therethrough for separation and recovery of the products.

4. A process according to claim 3 wherein said carrier is selected from the group consisting of steam, water, nitrogen, air, helium, hydrogen, hydrocarbons and mixtures thereof.

5. A process according to claim 4 wherein the temperature maintained in the column ranges from about 100° to about 250° C.

6. A process according to claim 5 wherein the $C_8$ aromatics feed mixture contains ethylbenzene, para-xylene, meta-xylene and ortho-xylene and wherein a mixture of the meta-xylene and ortho-xylene is initially removed from the column followed by the para-xylene and then the ethylbenzene.

7. A process according to claim 5 wherein the $C_8$ aromatics feed mixture contains para-xylene, meta-xylene, and ortho-xylene and wherein a mixture of meta-xylene and ortho-xylene is initially removed from the column followed by the para-xylene.

8. A process according to claim 2 wherein, in preparation of the modified zeolite, the zeolite and silane are reacted in weight ratios of about 5:1 to 1:5, respectively, in the presence of an organic solvent.

9. A process according to claim 8 wherein the organic solvent is pyridine and the reaction is carried out at a temperature of about 75° to 200° C.

10. A process according to claim 9 wherein the silane compound is of the formula:

wherein R is an alkyl group of 1 to about 40 carbon atoms, an alkyl or aryl acyl group where the organic portion of said alkyl group contains about one to 30 carbon atoms, and of said aryl group contains about six to 24 carbon atoms, aryl groups of about six to 24 carbon atoms, alkaryl and aralkyl groups containing about seven up to about 30 carbon atoms and each $R_1$ is the same as R, hydrogen, or a halogen atom, providing that no more than one $R_1$ is the same as R and at least one $R_1$ is halogen.

11. A process according to claim 10 wherein said zeolite and said silane are reacted in the presence of a binder for said zeolite by refluxing in a 3:1 to 1:3 weight ratio in n-heptane solvent.

12. A process according to claim 11 wherein said zeolite is selected from the group consisting of ZSM-5 type zeolites having the X-ray diffraction pattern of Table 1, ZSM-8 type zeolites having the X-ray diffraction pattern of Table 4 and mixtures thereof.

13. A process for the separation of a $C_8$ aromatic mixture feedstock into its component parts which comprises contacting said mixture with a modified zeolite which is the reaction product of a crystalline zeolite with an organic radical-substituted silane of the formula:

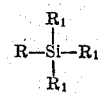

wherein R is an organic radical and $R_1$ is an organic radical, hydrogen or halogen, provided that at least one $R_1$ is halogen, by passing said $C_8$ aromatic mixture in contact with said modified zeolite whereby any mixture of meta-xylene and ortho-xylene passes through the modified zeolite rather uninhibited while any ethylbenzene and para-xylene are sorbed at different respective rates by the modified zeolite, removing a mixture of meta-xylene and ortho-xylene, recovering para-xylene followed by recovery of ethylbenzene, if the latter is present in the $C_8$ aromatic mixture, passing the mixture of meta-xylene and ortho-xylene into contact with a partitioning liquid whereby said meta-xylene and ortho-xylene are separated by sorption at different rates and recovering the meta-xylene followed by the ortho-xylene.

14. A process according to claim 13 wherein the zeolite is a ZSM-5 type zeolite having the X-ray diffraction pattern of Table 1, a ZSM-8 type zeolite having the X-ray diffraction pattern of Table 4 or mixtures thereof.

15. A process according to claim 14 wherein the $C_8$ aromatic feed mixture contains about 0 to 15 weight percent ethylbenzene, about 20 to 30 weight percent para-xylene, about 40 to 50 weight percent meta-xylene and about 15 to 25 weight percent ortho-xylene.

16. A process according to claim 15 wherein, in preparation of the modified zeolite, the zeolite and silane are reacted in weight ratios of about 5:1 to 1:5 in the presence of an organic solvent.

17. A process according to claim 16 wherein the organic solvent is pyridine and the reaction is carried out at a temperature of about 75° to 200° C.

18. A process according to claim 17 wherein the silane compound is a compound of the formula:

wherein R is an alkyl group of one to about 40 carbon atoms, an alkyl or aryl acyl group where the organic portion of said alkyl group contains about one to 30 carbon atoms, and of said aryl group contains about six to 24 carbon atoms, aryl groups of about six to 24 carbon atoms, alkaryl and aralkyl groups containing about seven up to about 30 carbon atoms, and each $R_1$ is the same as R, hydrogen or halogen atoms, providing that no more than one $R_1$ is the same as R and at least one $R_1$ is halogen.

19. A process according to claim 18 wherein said zeolite and said silane are reacted in the presence of a binder for said zeolite by heating in a 1:2 to 1:1 weight ratio in an organic solvent.

20. A process according to claim 19 wherein said partitioning liquid is selected from the group consisting of Terigtol NPX (nonyl phenol ether of polyethylene glycol), m-bis (m-phenoxy-phenoxy) benzene and 2 percent squalane, UCON 1840, UCON LB-550X, di-n-propyl tetrachlorophthalate, squalane, 40 percent 1,2,3 tris (2-cyanoethoxy) propane and 70 percent oxybis (2-ethylbenzoate) and di-n-decylphthalate.

21. A process according to claim 20 wherein the zeolite and partitioning liquid are maintained in columns through which the mixture is passed at a temperature of about 100° to 250° C.

22. A process according to claim 21 wherein the column containing the liquid has a volume about twenty times greater than the zeolite column.

23. A process according to claim 22 wherein a carrier is admixed with the mixture prior to passage through the columns and wherein the carrier is selected from the group consisting of steams, water, nitrogen, air, helium, hydrogen, hydrocarbons and mixtures thereof.

24. A process according to claim 23 wherein the zeolite is selected from the group consisting of ZSM-5 and ZSM-8 and the partitioning liquid is Tergitol NPX.

* * * * *